Patented Feb. 14, 1950

2,497,420

UNITED STATES PATENT OFFICE 2,497,420

MANUFACTURE OF LACTALBUMIN

Everette C. Scott and George W. McDonald, Chicago, Ill., assignors to Swift & Company, Chicago, Ill., a corporation of Illinois No Drawing. Application December 19, 1945, Serial No. 636,081

2 Claims. (Cl. 260—122)

This invention relates to the manufacture of lactalbumin and it has to do more particularly with the recovery of lactalbumin from whey.

Lactalbumin, a heat-coagulable protein, is found in milk to the extent of about one-half of 1 per cent. Since lactalbumin is not coagulated by the enzyme rennet and, therefore, does not precipitate with casein in cheese making, it is an ingredient in whey along with lactose, mineral constituents and traces of casein and fat.

Milk albumin, although similar to egg and blood albumin in many physical and chemical properties differs therefrom in its lower sulfur content. For this reason lactalbumin is more palatable than egg or blood albumin in similar various stages of decomposition. Numerous methods have heretofore been proposed for the preparation of lactalbumin so as to increase the commercial availability of lactalbumin for the use thereof either as an ingredient or as starting material in the preparation of various food products, as, for example, in the manufacture of cheese and/or in the preparation of hydrolysates. The prior methods for the extraction of lactalbumin from whey are expensive, tedious, and productive of low yields. For these reasons it has been found practicable and expedient to utilize whey as an animal or stock feed, thus more advantageously disposing of the lactalbumin. Generally, the methods heretofore proposed for the recovery of lactalbumin from whey fall into three groups:

1. Saturation of the lactalbumin-containing whey with various salts followed by dilution, acidulation, and, finally, long standing to effect crystallization.
2. Straight coagulation by means of heat.
3. Precipitation by a mineral acid, followed by resolution in alkali and reprecipitation with acid.

Methods 1 and 3 possess the disadvantage of being costly and requiring much time to effect the separation of the lactalbumin from the whey. Moreover, in methods 2 and 3 the yields are poor and the product inferior.

The general object of this invention is to provide a practical method for the production of lactalbumin.

Another object of the invention is a greater utilization of cheese whey by recovering a valuable ingredient therefrom.

Still another object is the preparation of an inexpensive, high quality food product from whey which has heretofore been more advantageously utilized as an animal feed.

A further object is the manufacture of an insoluble but readily hydrolyzed lactalbumin suitable for the incorporation thereof into food products.

Yet another object of the invention is the production of an edible coagulated lactalbumin capable of yielding hydrolysates of superior flavors, odor, and palatability.

Other objects and advantages of the invention will be apparent from the description of the invention given below.

We have found that we can overcome the disadvantages attendant the prior methods of isolating lactalbumin from whey and achieve the above-mentioned objects by a process which comprises generally the steps of adjusting the acidity of the whey so as to inhibit precipitation of the lactalbumin at a temperature below the heat-coagulable point of the lactalbumin, then heating the whey to a point within the heat-coagulable temperature range of lactalbumin, carefully readjusting the acidity to a point at which the acidity and the temperature effect the coagulation of the lactalbumin. We have found that if precipitation of the lactalbumin is prevented before the heating step by carefully controlling the acid content, subsequently heating the whey to a point within the heat-coagulable temperature range of the lactalbumin, and then readjusting carefully, as hereinafter to be described, the acidity of the whey, flocculation of the lactalbumin is sudden and in large curds or clumps, relatively pure, and easily recoverable as a float. This coagulum may then be further purified to yield an edible product which may be used in the manufacture of food products such as hydrolysates, possessing superior flavor and palatable characteristics by virtue of the purity of the lactalbumin.

In practicing the process of our invention, conventional equipment may suitably be employed. For example, the treating of the whey to neutralize, heat and acidulate the same and the subsequent flocculation of the lactalbumin therefrom may all be carried out in a conventional cheese vat. The coagulated lactalbumin is then skimmed from the surface of the whey, and may be placed on wire frames to allow the water to drain therefrom, subsequently drying or further purifying before drying, as hereinafter to be described.

More specifically, the invention contemplates a process entailing the steps hereinafter described.

Whey obtained as a result of cheese manufacture is neutralized by a suitable alkali, such as soda ash, sodium bicarbonate, lime or sodium hydroxide, until the titratable acidity of the whey is within the range of about 0.07 to 0.12 per cent. The neutralizing step is carried out at temperatures under 150° F., so as to prevent any coagulation of the protein. Fresh whey usually has an acidity in the upper limits of the range, namely, around 0.12 per cent, but since the acidity rises upon standing of the whey, normally to a value of about 0.17 to 0.25 per cent, it is often necessary to adjust the whey to the desired acidity. If fresh whey is employed in a continuous process utilizing whey immediately obtained just after the manufacture of cheese is complete, no neutralization is required since the whey has not been allowed to stand and hence develop acidity.

After the acidity of the whey has been determined to be about 0.07 to 0.12 per cent, it is heated by any conventional method of supplying heat, with or without agitation, to a temperature above 160° F. and preferably below the boiling point, which is about 215° F. It is desirable at this point that no precipitation of the lactalbumin occur. If the acidity of the whey is not adjusted to within the limits mentioned, precipitation of the lactalbumin will occur prematurely. Lactalbumin precipitated at this stage is finely divided and difficultly recoverable, and, for this reason, it is undesirable that any precipitation of the lactalbumin take place in the heating step.

To the properly acidic, hot, but not precipitated lactalbumin solution, is then added a mineral acid, such as hydrochloric, sulfuric, or phosphoric, hydrochloric acid being preferred. An organic acid, such as acetic or tartaric may also be suitably employed. Enough pre-calculated acid is employed to bring the total titratable acidity of the whey from a range of about 0.07 to 0.12 to about 0.15 to 0.30 per cent. Addition of the acid at this stage is effected without agitation of the solution. Uniform acidity is not desired at this point of the process. The acid range of about 0.15 to 0.30 per cent serves merely to define the quantity of the acid and not the distribution of the acid through the solution. In order to avoid agitation, it is often advantageous to add the acid down the side of the vessel, in a straightline flow. Adding the acid in a straightline flow without stirring or agitation causes the acid to sink to the bottom of the vessel, where a curd begins to form. The curd is scraped free from the bottom of the vat and rises to the surface in large clumps or curds and is collected. The scraping operation is done carefully so as to effect a minimum of turbulence. Careful scraping furnishes the proper agitation for the further coagulation of the protein. Continued scraping and skimming of the floated coagulum soon result in the complete removal of all the lactalbumin at which time the acid has become uniformly distributed throughout the vat and the residual liquor is crystal clear, containing only the sugars and salts normally remaining in the protein-free liquor. The slightest agitation in adding the acid to the whey results in a finely divided precipitate, necessitating settling, filtering, or centrifuging to recover it. However, by following the procedure herein described, the coagulum coheres and rises in large clumps or curds which are separated easily by skimming or by separating by means of relatively coarse screens. The clear liquor remaining is then uniformly acid to the extent of about 0.15 to 0.30 per cent titratable acid, provided the proper amount of acid has been added to the heated whey.

The coagulum removed is finally washed, drained, pressed and then dried in any suitable manner, as by spray drying. If the product is to be used at the point of production, much of this final processing may be eliminated.

In order to obtain a lactalbumin product of high purity, that is, one possessing a low ash and lactose content, the following procedure to effect the purification of the protein may be advantageously employed.

The recovered coagulum, having a solids content of about 20 to 25 per cent, obtained from the process hereinabove described, is allowed to cool whereupon the lactalbumin forms a stiff gel, having a firmly bound moisture content of about 75 per cent. However, by slowly freezing the product and subsequently thawing it out, the gel is destroyed. The water, by virtue of the protein having been de-stabilized as a result of the subsequent freezing and thawing operations, is held very loosely and the lactalbumin may be washed several times with water of any desired temperature to dissolve out the lactose and minerals. The lactalbumin may then be centrifuged or pressed to rid it of the loosely bound water, and if desired it may further be treated to dry it by any conventional manner, such as spray drying or pan drying.

In addition to the initial neutralizing step, the whey may be subjected to a preliminary treatment to improve the palatability and purity of the final lactalbumin. This preliminary treatment is employed to remove residues of casein and fat left behind in the making of cheese. If a high degree of palatability in the milk albumin is not particularly desirable, the small percentages of these materials may be left and recovered as part of the lactalbumin fraction. When the removal of fat and casein is desired, we have found that either of two conventional procedures may be satisfactorily employed:

1. Direct filtration removes suspended casein and a large portion of fat. Conventional cellulose fiber filter media are particularly suitable for reduction of fat.

2. Centrifugal procedures whereby the heavier casein may be removed by means of a clarifier and the lighter fat portion recovered through a separator.

The centrifuging step is particularly suitable where continuous operation is desired.

The following example is an illustrative preferred embodiment of the invention, but it is not to be taken as limiting the invention thereto, since many modifications and variations in the steps of the invention will occur to those skilled in the art.

A given amount of whey having a titratable acidity of 0.2 per cent (as lactic acid) was neutralized with a solution of sodium bicarbonate until the titratable acidity of the whey was about 0.09 per cent. Neutralization was carried out at a temperature of 72° F. The whey was then heated to a temperature of 180° F., after which enough of a 15 per cent solution of hydrochloric acid was carefully added without stirring down the side of the vessel until the total acid content of the whey was 0.25 per cent. A lactalbumin curd formed, rising immediately to the top, where it formed in large clumps and floated, soon covering the entire surface of the vat. On scraping the bottom of the vat just sufficiently to free the small amount of curd that adhered to the bottom of the vessel, this lactalbumin floated to the top of the vessel, joining the mass on the surface, This coagulum was skimmed off, drained, and allowed to cool until it formed a gel, after which the gel was frozen and subsequently allowed to thaw. The thawing operation destroyed the gel, whereby on stirring the water tended to separate from the albumin. The lactalbumin at this stage was broken into granular pieces, in contrast to the smooth texture possessed by the lactalbumin in the gel state. The mass was then passed through a hammer mill to break it up and impart the proper fluidity thereto, preparatory to drying it by atomizing the material in air heated to a temperature of 290° F. The lactalbumin was dried immediately and was collected as a fine powder.

Obviously many modifications and variations of the invention, as hereinbefore set forth, may be made without departing from the spirit and scope thereof, and therefore only such limitations should be imposed as are indicated in the appended claims.

We claim:

1. In the process of separating lactalbumin from whey as large floating cohesive clumps, readily separable from the whey and characterized by good draining properties, the steps which comprise adjusting the acidity of whey, calculated as lactic acid, to a point between 0.07 per cent and 0.12 per cent whereby coagulation of lactalbumin is inhibited within the heat-coagulable temperature range of lactalbumin, heating the so treated whey to within the said heat-coagulable temperature range of lactalbumin, adjusting the acidity of the heated whey as lactic acid while at said heat-coagulable temperature to an amount within the range of 0.15 per cent to about 0.30 per cent by adding the calculated amount of acid to the quiescent whey with a minimum of agitation, whereby the lactalbumin is suddenly precipitated in large floating clumps.

2. The process of recovering a light-colored, firm lactalbumin product as a float of large clumps, said float being readily separable from the whey and having good draining properties, which comprises adjusting the titratable acidity of said whey as lactic acid to a point between 0.07 per cent and 0.12 per cent, heating the so treated whey to within the heat-coagulable temperature range of lactalbumin, adjusting the acidity of the whey calculated as lactic acid, while at said heat-coagulable temperature to an amount within the range of 0.15 per cent to about 0.30 per cent by flowing a stream of the calculated amount of acid into the quiescent body of whey to effect the sudden flocculation of lactalbumin in large curds, which rise to the surface of the liquid, and recovering a firm, light-colored lactalbumin product from the surface of the liquid.

EVERETTE C. SCOTT.
GEORGE W. McDONALD.

REFERENCES CITED

The following references are of record in the file of this patent:

UNITED STATES PATENTS

| Number | Name | Date |
|---|---|---|
| 1,870,270 | Washburn | Aug. 9, 1932 |
| 2,194,835 | Nickerson | Mar. 26, 1940 |
| 2,232,248 | Lavett | Feb. 18, 1941 |
| 2,377,853 | Boyer et al. | June 12, 1945 |

FOREIGN PATENTS

| Number | Country | Date |
|---|---|---|
| 248,998 | Great Britain | Mar. 18, 1928 |

OTHER REFERENCES

Woodman, Jour. Agric. Science (1920), vol. 10, part 1, pp. 1 to 11.

Whetham et al., Jour. Royal Agric. Soc. (England), (1922), vol. 83, pp. 73 to 96.